United States Patent [19]

Armstrong et al.

[11] Patent Number: 4,537,610

[45] Date of Patent: Aug. 27, 1985

[54] METHOD AND APPARATUS FOR PRODUCING CHOPPED STRANDS

[75] Inventors: Gordon P. Armstrong, Newark; Martin C. Flautt, Granville, both of Ohio

[73] Assignee: Owens-Corning Fiberglas Corporation, Toledo, Ohio

[21] Appl. No.: 613,847

[22] Filed: May 24, 1984

[51] Int. Cl.³ .............................................. C03C 25/02
[52] U.S. Cl. ........................................ 65/3.44; 65/2; 65/10.2; 427/289; 427/375
[58] Field of Search ...................... 65/3.44, 2, 10.2, 12; 427/289, 375

[56] References Cited

U.S. PATENT DOCUMENTS

| | | | |
|---|---|---|---|
| 3,273,987 | 9/1966 | Marzocchi et al. | 65/3.44 X |
| 3,869,268 | 3/1975 | Briar et al. | 65/2 |
| 3,887,347 | 6/1975 | Reese | 65/3.44 |
| 4,043,779 | 8/1977 | Schaefer | 65/2 |

FOREIGN PATENT DOCUMENTS 321434  6/1957  Switzerland ..................... 65/3.44

*Primary Examiner*—Robert Lindsay

*Attorney, Agent, or Firm*—Ronald C. Hudgens; Greg Dziegielewski; Bryan H. Davidson

[57] ABSTRACT

Method for producing discrete bundles of filaments includes applying a non-aqueous, hot melt coating material to continuous filaments and gathering the coated continuous filaments into a bundle. The coating material is solidified on the continuous filament bundle so as to establish a first cross-sectional shape and the bundle is then severed into discrete segments whereby the bundle segments are deformed so as to exhibit a second cross-sectional shape at the severed regions. The bundle segments are then heated sufficiently to soften the coating material to permit the bundle segments to substantially return to the first cross-sectional shape.

The apparatus of the invention includes a primary applicator for applying a production coating to the filaments and an interim applicator for applying a start-up coating to the filaments. Structures are provided to orient the filaments between a production position wherein the filaments contact the primary applicator but not the interim applicator and a start-up position wherein the filaments contact the interim applicator but not the primary applicator.

27 Claims, 7 Drawing Figures

METHOD AND APPARATUS FOR PRODUCING CHOPPED STRANDS

TECHNICAL FIELD

The invention disclosed herein relates to method and apparatus for producing chopped strand of glass filaments having high bundle integrity wherein the coating on the filaments is a hot melt, non-aqueous material.

BACKGROUND

Glass fibers arranged in discrete bundle segments, or chopped strands, are widely used for reinforcements for thermosetting and thermoplastic resinous materials.

In some processes, the need for high bundle integrity is extremely important. For example, in the direct blending type of process, thermoplastic resin pellets and chopped strands of glass fibers are air conveyed to various points. Bundles of chopped strands without good integrity tend to disassociate or deteriorate which can cause process disruptions and even a reduction in the strength of the ultimate molded article.

Chopped strands produced by previous methods tend to have a flattened configuration, especially at the ends of bundles having large amounts of coating material theron. Chopped strands produced by the direct or inline process, wherein the glass filaments are concomitantly drawn from molten streams issuing from a feeder and chopped into discrete segments, characteristically but not necessarily, exhibit the flattened cross-sectional shape to a greater extent than strands chopped "off-line" (i.e., from wound packages).

In addition to the general flattening caused by the tension of the strand around the circumference of the cot of the chopper, the pinching action of the cutter roll against the cot roll upon the undried continuous strand to form the chopped strands severely deforms or flattens the bundles at the end regions thereof.

Such a flattened cross-sectional shape of the discrete bundles increases the bundle susceptibility to cracking, separation and fuzz (i.e., single filaments or small bundles projecting from the sides of the bundle).

The present invention provides method and apparatus for producing chopped strands having a hot melt coating thereon, having bundles exhibiting a rounded or compacted cross-sectional shape along substantially the full length thereof.

DISCLOSURE OF THE INVENTION

This invention pertains to method and apparatus for producing discrete bundles of glass filament comprising drawing streams of glass into continuous filaments; applying a liquified or molten hot melt, non-aqueous coating material to the continuous filaments; gathering the coated continuous filaments into a bundle; solidifying said coating material on said continuous bundle to fixedly establish a first cross-sectional shape; severing the bundle into discrete segments, the severing step deforming the bundle segments such that the bundle segments have a second cross-sectional shape; and heating the bundle segments having the second cross-sectional shape sufficient to soften the coating material to permit the bundle segments to return toward the first cross-sectional shape.

BEST MODE OF CARRYING OUT THE INVENTION

Figures 1, 2:
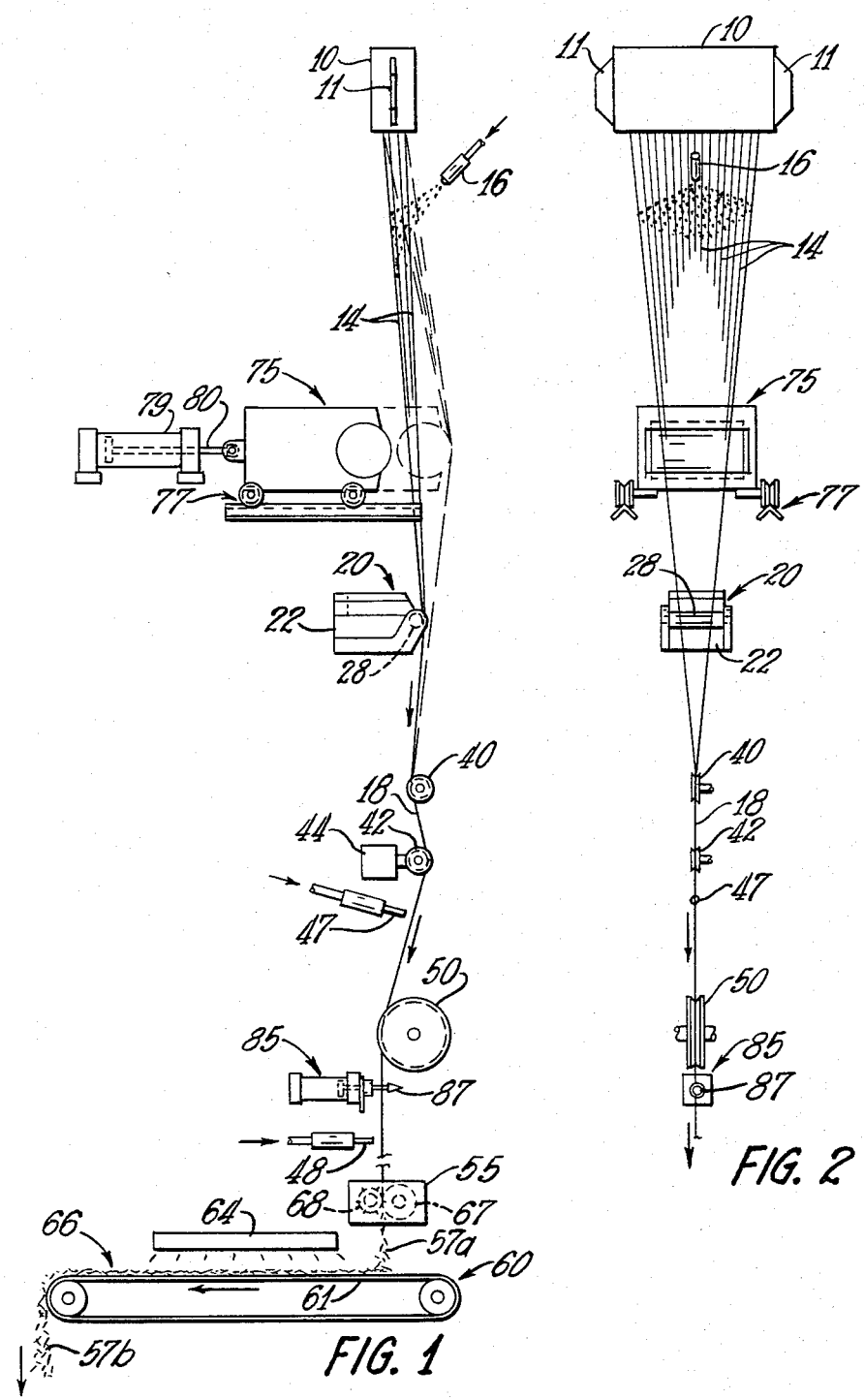
FIG. 1 is a schematic side view of a filament/chopped strand forming system according to the principles of this invention.
FIG. 2 is a schematic frontal view of the forming system shown in FIG. 1.
Figure 3:
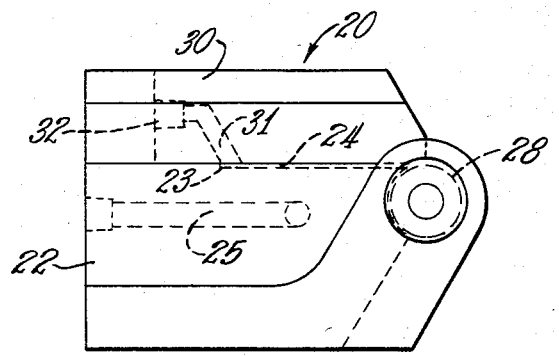
FIG. 3 is an enlarged side view of the hot melt coating applicator shown in FIG. 1.

As shown in FIG. 1, feeder 10 is adapted to supply molten streams of inorganic material, such as glass, which are attenuated or drawn into filaments 14 by means of chopping device 55 as is known in the art. Feeder 10 is equipped with a pair of terminals 11 to electrically energize feeder 10 to maintain the body of molten glass therewithin at the proper fiberizing temperature.

In operation, primary coating application means 20 supplies a suitable non-aqueous, liquified or heat softened "hot melt" coating material to coat the advancing continuous filaments 14. The coated continuous filaments 14 are then gathered into a bundle or strand 18 by means of first and second grooved rolls or gathering shoes 40 and 42.

Hot melt coating materials are generally characterized as having low viscosities at high temperatures that solidify upon cooling. To assist the air cooling occurring as the bundle 18 advances, first and second nozzles or cooling means 47 and 48, if necessary, direct a stream of cooling liquid, such as water, to increase the solidification rate of the hot melt coating.

To produce a continuous bundle having a rounded first cross-sectional shape, groove 51 of third groove roll 50 is semi-circular in shape. As shown, third groove roll 50 is positioned intermediate first nozzle 47 and second nozzle 48. As shown, the circumferential surface of roll 50 including groove 51 is continuous. If the coating material tends to adhere to the circumferential surface, a "squirrel cage" idler roll or rolls are preferably employed to reduce the tendency of the coated strand to "roll wrap". Preferably, the grooves of first and second gathering shoes 40 and 42 are also semi-circular in shape to assist in producing the rounded or first shape.

Figure 6:
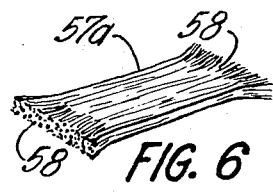
FIG. 6 is an enlarged view of one of the discrete bundles of glass filaments in the flattened or deformed condition.
Figure 4:
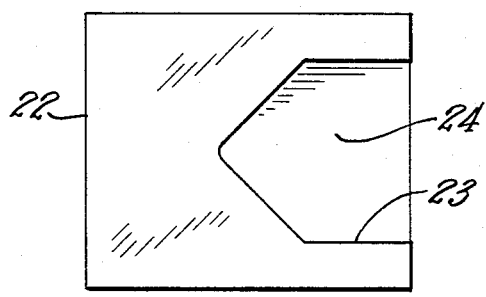
FIG. 4 is a top view of a portion of the coating applicator shown in FIG. 3.

Severing means or chopper 55 severs the continuous bundles of filaments 18 into discrete segments 57a. As previously discussed, discrete segments 57a, as shown in FIG. 6, are deformed from the desired rounded or circular shape due to the forces applied to the strand 18 by chopper 55. Chopper 55 may be of any suitable type. In general, chopper 55 is comprised of a cot roll 67 having an elastomeric circumferential surface in contact with a cutter roll 68 having a plurality of radially extending blades or cutters with the discrete segments 57a being formed as the strand 18 is passed between the nip of rolls 67 and 68. Generally, strand 18 is wrapped partially around driven cot roll 67 to provide a "grip" upon strand 18 sufficient to permit chopper 55 to supply the attenuative force to draw filaments 14 from the molten streams.

As shown in FIG. 6, discrete bundles 57a exhibit a flattened or second cross-sectional shape having pinched or flattened ends 58 that extend outwardly along the line of the cut.

Figure 7:
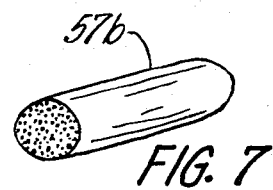
FIG. 7 is an enlarged view of one of the discrete bundles produced according to the principles of this invention.
Figure 5:
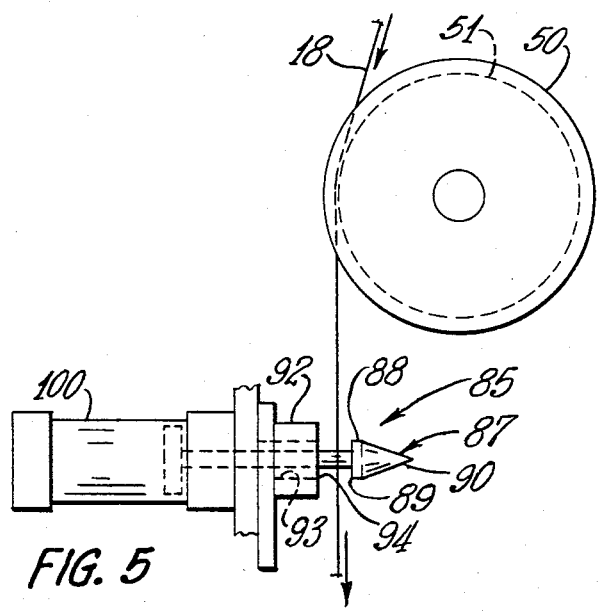
FIG. 5 is an enlarged view of the emergency strand severing apparatus shown in FIG. 1.

According to the principles of this invention, deformed discrete bundles 57a are caused to substantially return to or toward the original rounded configuration or first cross-sectional shape by heating or softening the coating of bundle segments 57a to permit the coating to reflow or "deflatten" to or toward the rounded shape as shown in FIG. 7. As shown, the treated segment 57b has an elliptical shape rather than a perfect circular shape.

It is believed that the internal stresses set up in the deformed discrete segments 57a, especially at ends 58, by the mechanical deformation of the bundle 18, coated with at least partially solidified coating material, established by chopper 55 tend to reflow or reform the hot melt material as the material is softened upon heating. It is believed that, in part, the coating material moves or reforms to release or reduce such internal stresses, and in doing so, returns the discrete bundle to or toward the original or rounded cross-sectional shape. Further, as the temperature of the coating material is raised near the liquidus temperature of the material, the surface tension of the coating material tends to assist in rounding out or reforming the bundle segment, that is, returning it to or toward the original cross-sectional shape.

As shown in FIG. 1, deformed discrete segments 57a are dropped onto endless belt 61 of conveyor means 60 to pass segments 57a along heating means 64. Heating means 64 may be of any suitable type, such as an infrared heater.

The temperature to which the coating material is raised by heating means 64 in the reflow or reformation zone 66 will depend upon the properties of the particular hot melt coating employed. Preferably, the temperature of the discrete bundles 57a within the reflow zone is greater than 100° C. to remove at least some of the residual cooling water previously applied to strand 18. And more preferably, the discrete bundle should be heated to a temperature greater than the softening point or glass transition temperature of the coating material to more effectively reflow or return the discrete bundles to the rounded or first cross-sectional shape as shown in FIG. 7. The reformed discrete bundles 57b may then be packaged or further processed as desired. Depending upon the type of coating material employed and the temperature to which the bundles are heated in zone 66, forced cooling, by any suitable means, such as forced air cooling, may be necessary before packaging or processing.

The hot melt materials generally liquify upon heating and solidify upon cooling. The "hot melt" coating materials, according to the principles of this invention, may be of any suitable type. For example, the following compositions may be suitable for the practice of the instant invention.

Composition Number I is a non-aqueous, hot melt coating for glass fibers consisting of a silane, an ethylene-ethyl acrylate copolymer, a microcrystalline wax, a phenolic-modified terpene resin and a chemically modified polyolefin as set forth in concurrently filed U.S. patent application Ser. No. 613,846 filed May 24, 1984 in the name of Armstrong et al, which is hereby incorporated by reference.

Composition Number II is a non-aqueous hot melt coating composition consisting of an ethylene-ethyl acrylate copolymer, a low molecular weight polyethylene wax, a chemically-modified terpene resin and a silane, as set forth in concurrently filed U.S. patent application Ser. No. 613,940 filed May 24, 1984 in the name of Pollet et al, which is hereby incorporated by reference.

According to the principles of this invention, the hot melt coating may comprise from about 4% to about 30% or more, of the coated bundle by weight. Preferably, the hot melt coating material comprises from about 6% to about 15% of the coated bundle by weight. As such, it is seen that relatively high loadings of the coating material can be applied to the filaments in an in line process at the feeder 10 while achieving a desirable bundle shape.

Further, such reflowed discrete bundles 57b generally exhibit improved bundle integrity, a more compact shape with fewer small bundles or individual filaments extending outwardly from the main bundle as fuzz or nap.

Although the discrete bundles have been heretofore described as having a rounded first cross-sectional shape, it is contemplated that such bundles may have other cross-sectional shapes, such as triangular, if desired, wherein the reflowing of the coating material in zone 66 is effective to reduce or eliminate the flattening or deformation of the end regions of the bundle segments as chopped.

Hot melt coating applicator 20 may be of any suitable type. As shown, applicator means 20 is comprised of a body 22 having a planar recess 23 extending along one surface thereof. Cap 30 is adapted to mate with body 22 along recess 23 to form a narrow chamber 24 through which the hot melt coating material is pressure fed. Port 32 in cap 23 is in communication with chamber 24 via passageway 31. Port 32 is supplied with heat softened or liquified hot melt coating material from any suitable pump or supply (not shown).

Body 22 also may include a recess 25 adapted to receive a suitable heating means, such as an electrically energized resistance type heater, or heaters, if desired.

The coating material passes from chamber 24 to the surface of roll 28 which is preferably driven in the direction of the advancing filaments by any suitable means (not shown). The advancing filaments receive the coating material from the surface of roll 28.

To facilitate startup of production, an interim coating applicator 75 may be employed to provide any suitable aqueous based size or coating. As shown, interim coating applicator 75 is associated with carriage system 77 and motive means 79. Rod or connector 80 connects motive means 79 and carriage 77. Motive means 79 may be of any suitable type such as the pneumatic cylinder shown in FIG. 1.

At startup, motive means 79 is activated to move interim coating applicator 75 on carriage system 77 forward of applicator 20 so as to orient filaments 14 to not contact roll 28 primary applicator 20 and thus not be coated with the hot melt coating. Additionally, if desired, nozzle 16 applies a spray of water to filaments 14 prior to the filaments being coated with the interim aqueous size.

Once the operator has threaded up the system such that the chopping means or severing means 55 is drawing filaments 14 from feeder 10, the operator activates a suitable control means or switch (not shown) to terminate the spray from nozzle 16 and move interim coating applicator means 75 away from the filaments 14 such that the advancing filaments 14 contact primary applicator means 20 and not applicator means 75. The startup position of interim applicator means 75 is shown in phantom in FIG. 1, and the production position for interim applicator 75 is otherwise shown in FIG. 1. Alternatively, primary applicator 20 may be movable, and interim applicator may be fixed and/or movable.

Additionally, an emergency strand severing means 85 may be employed to help protect chopping means 55 in case of production disruptions. Emergency strand severing means 85 may be activated by the operator manually engaging a suitable switch, or emergency strand severing means may be activated by sensing means 44 associated with, for example, second grooved roll 42. Preferably, sensing means 44 is a load cell connected to second groove roll 42 to ultimately sense the load applied to roll 42 by the tension of advancing bundle 18 in contact therewith. If the load, that is, the tension of strand 18, exceeds or falls below a predetermined value, load cell 44 may be conveniently electrically interconnected with a solenoid valve to operate emergency strand severing means 85.

Emergency strand severing means 85 may be of any suitable type. Preferably, however, emergency strand severing means 85 is of the type as disclosed in concurrently filed patent application Ser. No. 613,854 filed May 24, 1984 in the name of Armstrong et al, which is hereby incorporated by reference.

Briefly, such a strand severing means 85 is comprised of a moveable cutting head 87 having a circular base section having a peripheral cutting edge 89. Extending outwardly from base section 88, conical section 90 is adapted to permit strand 18 to readily slide over cutting head 87 without unduly disturbing advancing strand 18 as the cutting head 87 is moved from the retracted position to the extended position.

Upon activation, cutting head 87 is forcefully withdrawn into bore 93 of casing or die 92. Bore 93 is conveniently provided with cutting edge 94 on the periphery thereof to assist in severing the strand 18.

Motive means 100, which may be of any suitable type such as a pneumatic cylinder, is connected to cutting head 87 to move cutting head 87 into the retracted position upon activation. As shown, running strand 18 is positioned intermediate cutting head 87 and die 92 in preparation of being activated to terminate the drawing of the hot melt coated strand into chopper 55.

Applying the principles of this invention, discrete bundles of glass fibers containing, for example, about 2,000 filaments may be produced in any suitable lengths, for example, from approximately ¼ inch, or less, to 2 inches or more.

As shown, a single strand of filaments 18 is associated with chopper 55. It is to be understood that more than one strand can be supplied from a feeder 10, and more than one feeder can be associated with a single chopper.

It is apparent that within the scope of the present invention, modifications and different arrangements can be made other than as herein disclosed. The present disclosure is merely illustrative of the invention comprehending all variations thereof.

INDUSTRIAL APPLICABILITY

The invention described herein is readily applicable to the production of glass fibers.

We claim:

1. A method of producing discrete bundles of filaments comprising:
    drawing streams of glass into continuous filaments;
    applying a molten, non-aqueous, hot melt coating material to the continuous filaments;
    gathering the coated continuous filaments into a bundle;
    solidifying said coating material on said continuous bundle to fixedly establish a first cross-sectional shape;
    severing the bundle into discrete segments at a severing means, the severing step deforming the bundle segments such that the bundle segments have a second cross-sectional shape at the severing regions; and
    heating the bundle segments having the second cross-sectional shape sufficient to soften the coating material to permit the bundle segments to substantially return to the first cross-sectional shape.

2. The method of claim 1 wherein the first cross-sectional shape is substantially round.

3. The method of claim 1 wherein the hot melt coating is a thermoplastic material.

4. The method of claim 1 further comprising cooling the continuous coated bundle prior to the severing step.

5. The method of claim 4 wherein said cooling is effected by contacting the bundle with a liquid.

6. The method of claim 4 wherein the continuous bundle is cooled by contacting the bundle with a plurality of spaced apart streams of water.

7. The method of claim 1 further comprising sensing the tension of continuous bundle and cutting the bundle prior to said severing means when the sensed tension is above or below preselected limits.

8. The method of claim 1 wherein the temperature of the coating of the bundle segments is raised to about the glass transition temperature of the coating material during the heating step.

9. The method of claim 5 wherein the cooling liquid is water and the temperature of the coating material of the discrete bundles is greater than about 100° C. but less than the liquidus temperature of the coating material during the heating step.

10. The method of claim 1 wherein the coating material comprises from about 4% to about 30% of the coated bundle by weight.

11. The method of claim 10 wherein the coating material comprises from about 6% to about 15% of the coated bundle by weight.

12. The method of claim 1 further comprising applying an aqueous based coating material to the continuous filaments instead of the non-aqueous coating material to facilitate startup.

13. The method of producing discrete bundles of filaments comprising:
    providing a plurality of continuous inorganic filaments;
    applying a heat softened, non-aqueous coating material to the continuous filaments, the coating having a tendency to reform toward the immediately preceding solidified shape upon softening if mechanically deformed from the solidified shape;
    gathering the continuous filaments in a bundle;

solidifying said coated bundle of continuous filaments to fixedly establish a first cross-sectional shape of said coated bundle;

severing the coated bundle of filaments into discrete segments, the severing step establishing a second cross-sectional shape over at least a portion of such segments; and softening the coating of the discrete bundle segments sufficient to permit the bundle segment to substantially reform toward the first cross-sectional shape.

14. The method of claim 13 wherein said coating is a thermoplastic or thermoplastic based material.

15. The method of claim 14 wherein said softening is effected by heating the discrete bundle segments.

16. The method of claim 14 wherein the coating is applied to the continuous filaments in a molten condition.

17. The method of claim 13 further comprising cooling the coated bundle of continuous filaments to assist in solidifying the coating thereon.

18. The method of claim 13 further comprising contacting the coated bundle of continuous filaments with a fluid to at least assist in solidifying the coating thereon.

19. Apparatus for producing discrete bundles of filaments comprising:

a coating applicator including (a) primary applicator means for applying a molten, non-aqueous, hot melt coating material to the continuous filaments during production, (b) interim applicator means for applying an aqueous based coating material to the continuous filaments to facilitate startup, and (c) orienting means for orienting said filaments between a production position wherein said filaments contact said primary applicator means but not said interim applicator means and a startup position wherein said filaments contact said interim applicator means but not said primary applicator means;

gathering means for gathering the coated continuous filaments into a bundle having a first cross-sectional shape;

severing means for severing the bundle, at severing regions, to form discrete bundle segments and for deforming the bundle segments such that the bundle segments have a second cross-sectional shape at the severing regions; and heating means for heating the bundle segments having the second cross-sectional shape sufficient to soften the coating material to permit the bundle segments to substantially return to the first cross-sectional shape.

20. Apparatus for producing discrete bundles of filaments comprising:

means for providing a plurality of continuous inorganic filaments;

a coating applicator including (a) primary applicator means for applying, during production, a heat softened, non-aqueous coating material to the continuous filaments, the coating having a tendency to reform toward the immediately preceding solidified shape upon softening if mechanically deformed from the solidified shape, (b) interim applicator means for applying an aqueous-based material to the filaments during startup, and (c) orienting means for orienting said filaments between a production position wherein said filaments contact said primary applicator means but not said interim applicator means and a startup position wherein said filaments contact said interim applicator means but not said primary applicator means;

gathering means for gathering the continuous coated filaments into a bundle having a first cross-sectional shape;

severing means for severing the bundle of coated filaments into discrete segments, said severing means for establishing a second cross-sectional shape over at least a portion of such segments; and softening means for softening the coating of the discrete bundle segments sufficient to permit the bundle segments to substantially reform toward the first cross-sectional shape.

21. The method of claim 20 wherein said softening means comprises an infra-red heating device.

22. Apparatus as in claim 19 wherein said orienting means includes carriage means for mounting said interim applicator means for movement between an advanced position wherein said interim applicator means contacts said filaments so that said filaments are oriented in said startup position and a retracted position wherein said interim applicator means is in spaced relation to said filaments to permit said filaments to assume said production position; and motive means for moving said carriage means between said advanced and retracted positions.

23. Apparatus as in claim 20 wherein said orienting means includes carriage means for mounting said interim applicator means for movement between an advanced position wherein said interim applicator means contacts said filaments so that said filaments are oriented in said startup position and a retracted position wherein said interim applicator means is in spaced relation to said filaments to permit said filaments to assume said production position; and motive means for moving said carriage means between said advanced and retracted positions.

24. Apparatus for producing discrete bundles of filaments comprising:

filament-forming means for forming a plurality of discrete filaments;

a coating applicator including (a) primary applicator means for applying a production coating to said filaments, (b) interim applicator means for applying a startup coating to said filaments, and (c) orienting means for orienting said filaments between a production position wherein said filaments contact said primary applicator means but not said interim applicator means and a startup position wherein said filaments contact said interim applicator means but not said primary applicator means;

gathering means for gathering said filaments into a bundle; and severing means for severing said bundle into discrete segments.

25. Apparatus as in claim 24 wherein said primary applicator means includes means for applying a molten, non-aqueous, hot melt coating material as said production coating.

26. Apparatus as in claim 24 wherein said interim application means includes means for applying an aqueous based coating material as said startup coating.

27. Apparatus as in claim 24 wherein said orienting means includes:

carriage means for mounting said interim applicator means for movement between an advanced position wherein said interim applicator means contacts said filaments so that said filaments are oriented in said startup position and a retracted position wherein said interim applicator means is in spaced relation to said filaments to permit said filaments to assume said production position; and motive means for moving said carriage means between said advanced and retracted positions.

* * * * *